(12) United States Patent
McCloud

(10) Patent No.: US 8,985,921 B2
(45) Date of Patent: Mar. 24, 2015

(54) SIDE RAIL OF A FLATBED TRAILER FOR USE WITH CARGO RESTRAINT DEVICES

(71) Applicant: Travis Smith McCloud, Cadiz, IN (US)

(72) Inventor: Travis Smith McCloud, Cadiz, IN (US)

(73) Assignee: Wabash National, L.P., Lafayette, IN (US)

( * ) Notice: Subject to any disclaimer, the term of this patent is extended or adjusted under 35 U.S.C. 154(b) by 10 days.

(21) Appl. No.: 13/803,092

(22) Filed: Mar. 14, 2013

(65) Prior Publication Data
US 2013/0257094 A1 Oct. 3, 2013

Related U.S. Application Data

(60) Provisional application No. 61/611,325, filed on Mar. 15, 2012.

(51) Int. Cl.
*B60P 7/08* (2006.01)
*B62D 25/20* (2006.01)

(52) U.S. Cl.
CPC ........... *B62D 25/2054* (2013.01); *B60P 7/0807* (2013.01); *B60P 7/0815* (2013.01)
USPC ............ 410/102; 410/106; 410/115; 410/116

(58) Field of Classification Search
USPC ..................... 410/8, 102, 104–106, 108–110, 410/113–116; 24/265 CD, 115 K; 296/182.1, 296/184.1; 248/499
See application file for complete search history.

(56) References Cited

U.S. PATENT DOCUMENTS

| | | | | |
|---|---|---|---|---|
| 6,799,927 | B2 * | 10/2004 | Wheatley | 410/104 |
| 7,476,070 | B1 * | 1/2009 | Abato, Jr. | 410/107 |
| 7,537,423 | B1 | 5/2009 | Abato, Jr. | |
| 8,057,143 | B2 * | 11/2011 | Adams | 410/104 |

* cited by examiner

*Primary Examiner* — Stephen Gordon

(57) ABSTRACT

A side rail of a floor assembly of a trailer, such as a flatbed trailer, including a channel formed in a top wall of the side rail and an aperture formed in the top wall of the side rail at a location spaced-apart from the channel. The channel extends along a length of the side rail and is configured to receive a first cargo restraint device therein. The aperture is configured to receive a second cargo restraint device therein.

12 Claims, 5 Drawing Sheets

SIDE RAIL OF A FLATBED TRAILER FOR USE WITH CARGO RESTRAINT DEVICES

This application claims priority under 35 U.S.C. §119(e) to U.S. Provisional Patent Application Ser. No. 61/611,325 entitled SIDE RAIL OF A FLATBED TRAILER FOR USE WITH CARGO RESTRAINT DEVICES and filed Mar. 15, 2012, the entirety of which is hereby incorporated by reference herein.

FIELD OF THE INVENTION

The present invention relates generally to a side rail of a floor assembly for a transportation vehicle, such as a flatbed trailer, for example. In particular, the present invention relates to a side rail of a flatbed trailer configured to accommodate two different cargo restraint cargo restraint devices to allow a user to use one or both devices to restrain or position cargo on the floor assembly.

BACKGROUND OF THE INVENTION

When transporting bulky loads, such as cargo, from place to place on a trailer, such as a flatbed trailer, for example, the load is typically secured to the trailer in order to prevent the load from moving relative thereto. Various cargo restraint devices are provided for securing the cargo to the trailer and the trailer may be configured in one or more ways to allow a particular type of cargo restraint device to be coupled thereto. An example of one such device is a chain tie-down device such as that described in U.S. Pat. No. 7,537,423. A flatbed trailer may be configured such that a chain tie-down device is able to be provided in a side rail of the floor assembly of a flatbed trailer, for example. Another cargo restraint device includes a multi-position sliding bracket configured to slide along a channel typically located in the side rail of the floor assembly of the trailer. The sliding bracket is able to be positioned at any location within the channel and along the length of the trailer side rail in order to provide an optimal location for securing cargo on the trailer. Typically, the side rail of the trailer may be configured to accept either the chain tie-down restraint device or the sliding bracket (i.e., multi-position) restraint device, but not both, thus limiting the means available to the user to tie down or restrain various cargo loads on the trailer.

SUMMARY

The present invention may comprise one or more of the features recited in the attached claims, and/or one or more of the following features and combinations thereof.

According to one aspect of the present disclosure, a side rail configured to be coupled to a cross-member of a floor assembly of a trailer, such as a flatbed trailer, includes a channel formed in a top wall of the side rail. The channel extends along a length of the side rail and is configured to receive a first cargo restraint device therein. The side rail further includes an aperture formed in the top wall at a location spaced-apart from the channel. The aperture is configured to receive a second cargo restraint device therein.

In one illustrative embodiment, the first cargo restraint device may be different from the second cargo restraint device.

In another illustrative embodiment, the aperture may be spaced inwardly from the channel.

In still another illustrative embodiment, the channel may be generally J-shaped when viewed in cross-section.

In yet another illustrative embodiment, the side rail may also include (i) an outer, vertical wall coupled to the top wall, and (ii) a bottom wall coupled to the outer, vertical wall. Illustratively, the side rail may be devoid of any angled cross brace extending from the top wall to either the outer, vertical wall or the bottom wall. Further illustratively, the outer, vertical wall may be a first outer, vertical wall, and the side rail may also include a second outer, vertical wall parallel to the first outer, vertical wall. Illustratively, the channel may be positioned generally directly above the first and second outer, vertical walls.

In still another illustrative embodiment, the channel formed in the top wall may be defined by spaced-apart vertical members and a base member coupled to the bottom of the vertical members. Illustratively, a portion of the base member may be configured to be welded to a cross-member of the floor assembly.

In yet another illustrative embodiment, the channel may be configured to be positioned outside a lateral end of a cross-member of the floor assembly when the side rail is coupled to the cross-member.

In still another illustrative embodiment, the channel may be positioned outwardly from a center of the top wall when viewed in cross-section.

In another illustrative embodiment, the top wall may include a channel mount configured to define the channel therein. The top wall may also include a horizontal member and first and second vertical members extending downwardly from the horizontal member. Illustratively, the first and second vertical members may be configured to be welded to the cross-member of the floor assembly. Further illustratively, the aperture may be positioned between the channel mount and the second vertical member.

According to another aspect of the present disclosure, a side rail configured to be coupled to a cross-member of a floor assembly of a trailer, such as a flatbed trailer, includes a top wall having a channel mount defining a channel extending along a length of the side rail. The channel is configured to receive a first cargo restraint device therein. The top wall also includes a horizontal member configured to be spaced-apart from a top surface of the cross-member. The top wall further includes a vertical member extending downwardly from the horizontal member. The vertical member is configured to be coupled to the top surface of the cross-member. Illustratively, an aperture of the side rail is formed in the horizontal member and is positioned between the channel mount and the vertical member. The aperture is configured to receive a second cargo restraint device therein that is different from the first cargo restraint device. The side rail further includes an outer, vertical wall coupled to and extending downwardly from the channel mount. The outer, vertical wall is configured to engage an outer end of the cross-member.

In one illustrative embodiment, the channel may be generally J-shaped in cross-section.

In another illustrative embodiment, the side rail also includes another outer, vertical wall member coupled to and extending downwardly from the channel mount. Illustratively, the outer, vertical wall members are spaced-apart from each other.

According to yet another aspect of the present disclosure, a floor assembly of a vehicle, such as a flatbed trailer, for example, includes a plurality of transversely extending cross members, a plurality of longitudinally-extending floor planks positioned above and coupled to a top surface of the plurality of cross members, and a support member configured to extend generally along a length of the floor assembly. Illustratively, the support member includes a top wall generally flush with the plurality of longitudinally-extending floor planks, and a vertical wall coupled to the top wall and extending downwardly therefrom such that a bottom end of the vertical wall is positioned generally below the cross members. Further illustratively, the support member is positioned between two of the longitudinally-extending floor planks. The top wall of the support member includes a channel formed therein which extends along a length of the support member. The channel is configured to receive a cargo restraint device therein.

In one illustrative embodiment, the channel may be generally J-shaped when viewed in cross-section.

In another illustrative embodiment, the channel formed in the top wall may be defined by spaced-apart vertical members and a base member coupled to the bottom of the vertical members. Illustratively, the base member may be wider than a widest portion of the channel. Further illustratively, the base member may be welded to a cross-member of the floor assembly.

In yet another illustrative embodiment, the floor assembly may also include a side rail spaced apart from the support member. The side rail may include a top wall defining a channel and an aperture spaced-apart from the channel. Illustratively, the channel of the side rail may be configured to receive the cargo restraint device therein. Further illustratively, the aperture may be configured to receive a different cargo-restraint device therein.

DETAILED DESCRIPTION OF THE PREFERRED EMBODIMENT

For the purposes of promoting an understanding of the principles of the invention, reference will now be made to illustrative embodiments shown in the attached drawings and specific language will be used to describe the same. While the concepts of this disclosure are described in relation to a flatbed trailer, it will be understood that they are equally applicable to other vehicles generally, and more specifically to conventional truck and/or box or van type trailers (dry van and refrigerated), examples of which include, but should not be limited to, straight truck bodies, small personal and/or commercial trailers and the like. Accordingly, those skilled in the art will appreciate that the present invention may be implemented in a number of different applications and embodiments and is not specifically limited in its application to the particular embodiments depicted herein.

Figure 1:
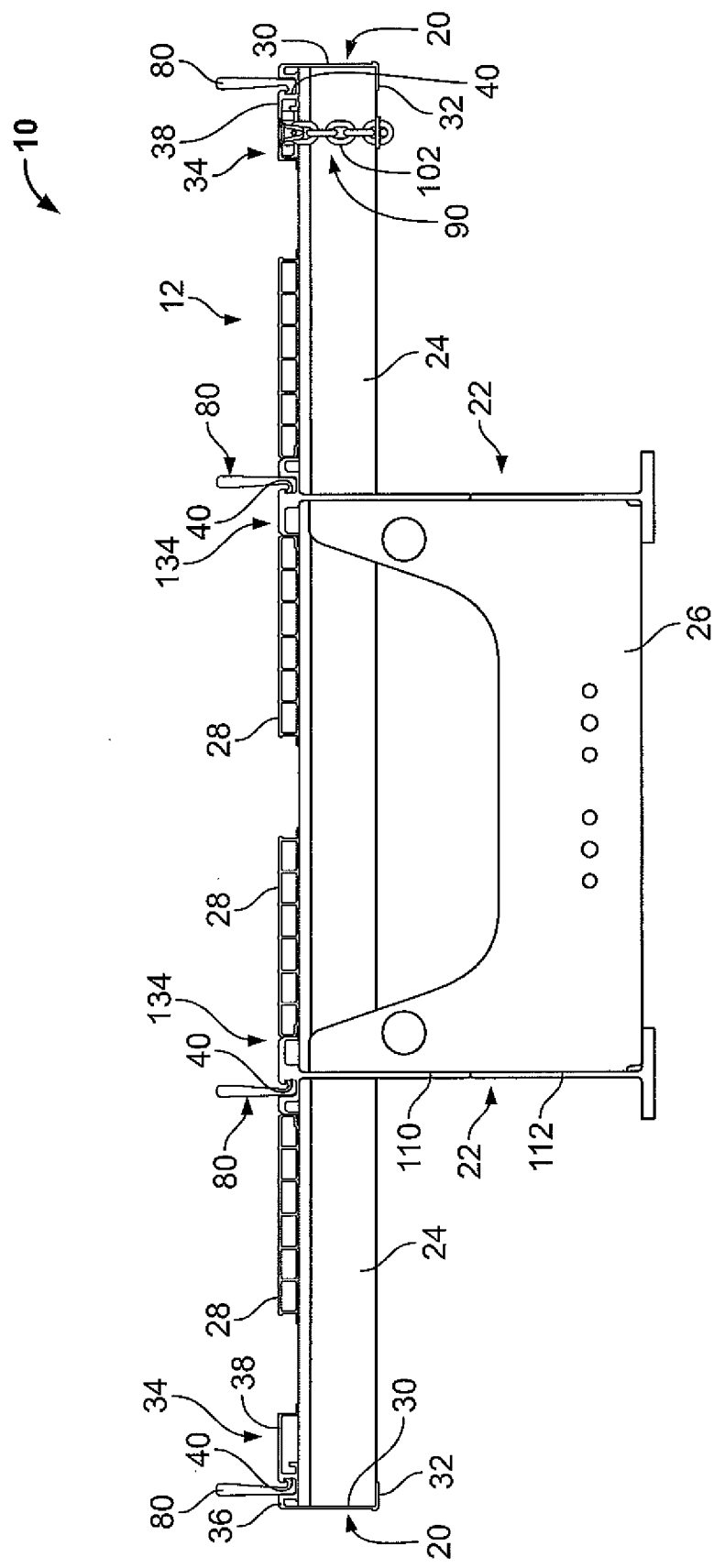
FIG. 1 is a rear end view of a flatbed trailer of the present disclosure showing a floor assembly of the trailer including right and left side rails each configured for use with two different cargo restraint systems, and further showing two I-beams of the floor assembly configured for use with one of the cargo restraint systems.
Figure 2:
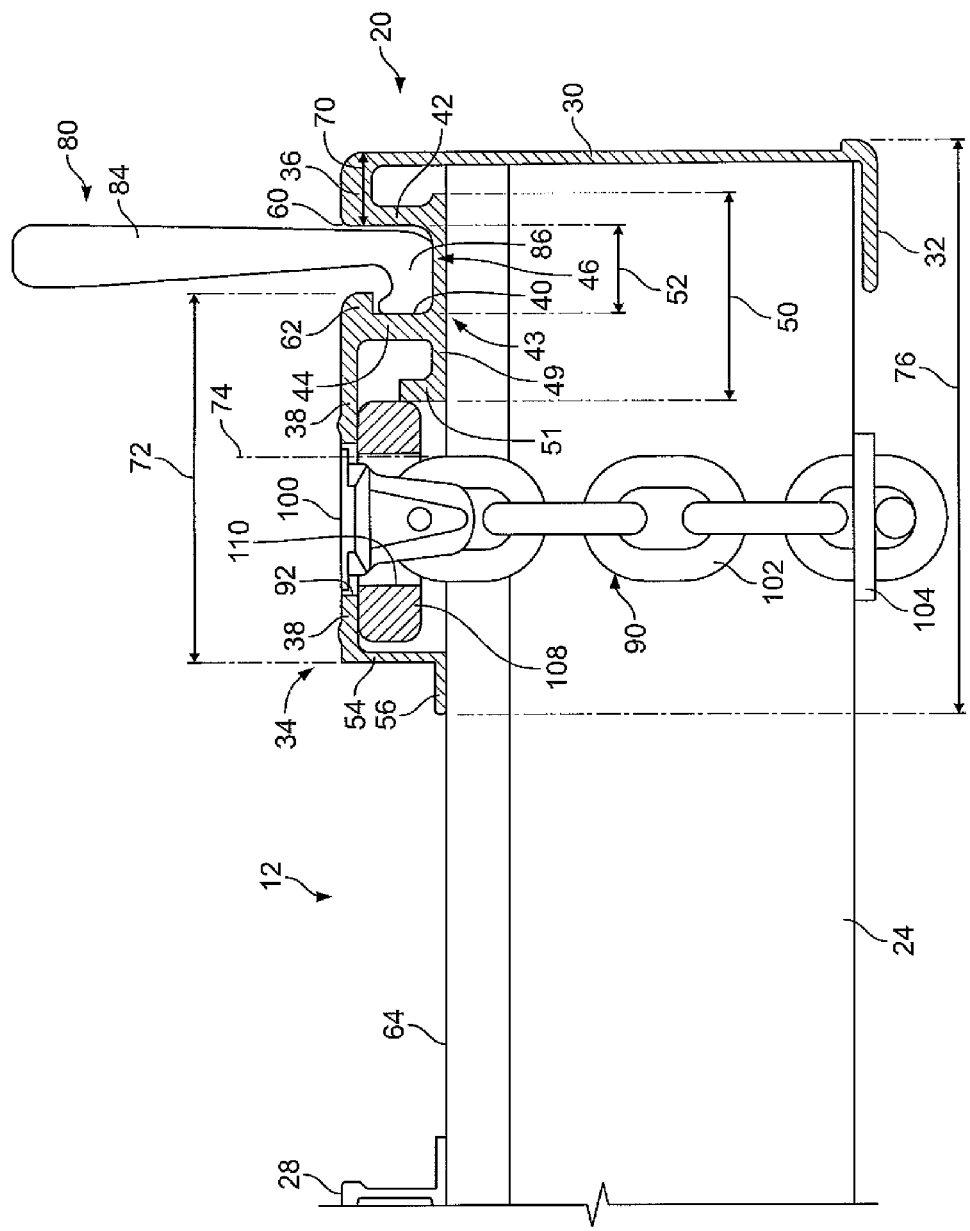
FIG. 2 is a sectional view through the right side rail of the trailer of FIG. 1 (as viewed from the rear end of the trailer) showing first and second restraint systems coupled to the side rail of the trailer for securing cargo thereon.
Figure 3:
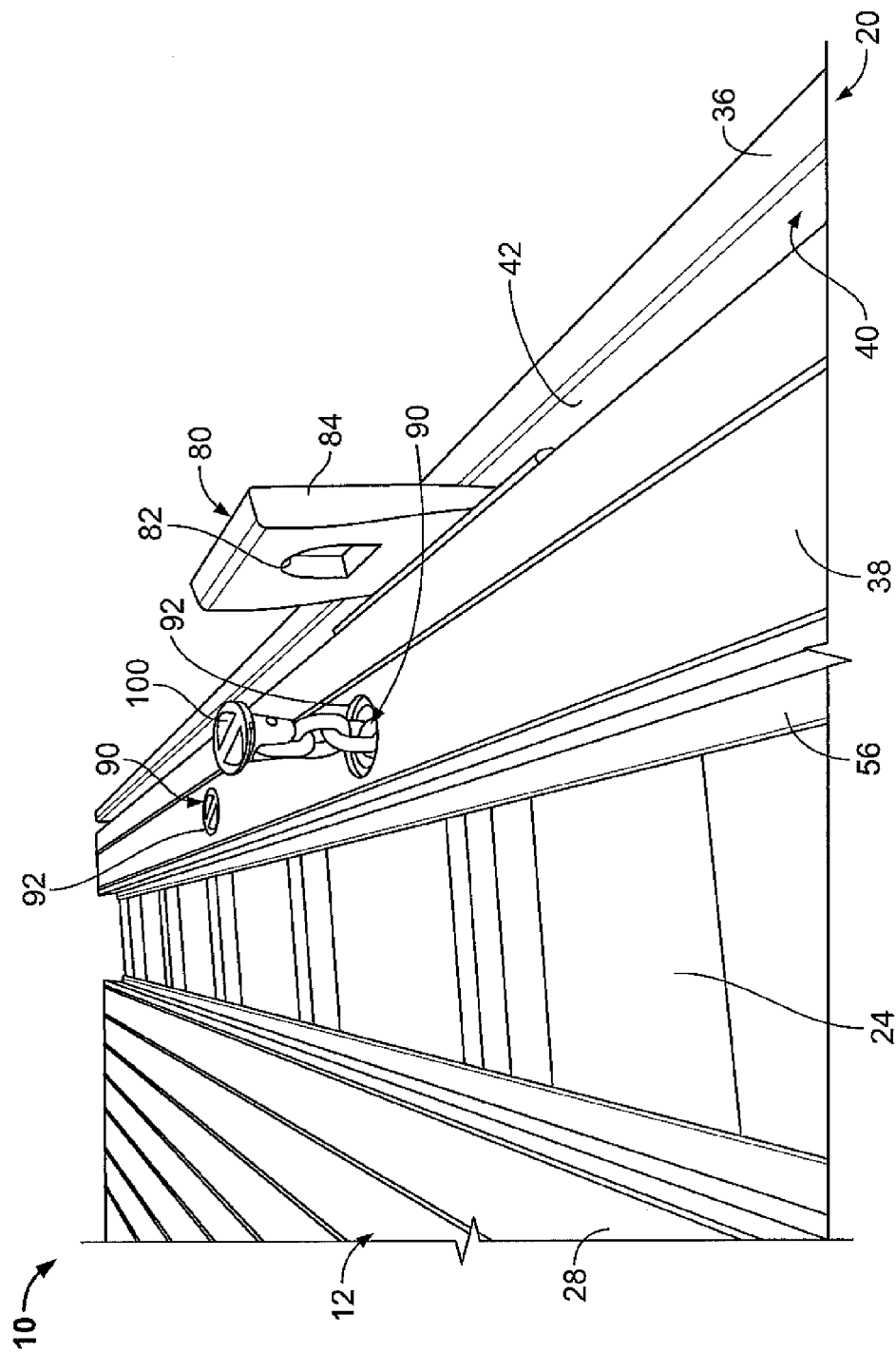
FIG. 3 is a perspective view of a portion of the flatbed trailer of FIGS. 1 and 2 showing the first and second restraint systems coupled to the side rail of the trailer.

Looking first to FIGS. 1-3, a flatbed trailer 10 includes a floor assembly 12, a rear wheel assembly (not shown), and a kingpin (not shown) configured to be coupled to a tractor (not shown) for towing the flatbed trailer 10. The floor assembly 12 of the flatbed trailer 10 includes first and second side rails 20 each configured to extend along a length of the trailer 10 along the right and left sides of the trailer 10, as shown in FIGS. 1 and 2, for example. The floor assembly 12 further includes longitudinally-extending support beams, such as the I-beams 22 shown in FIG. 1, for example, as well as transversely-extending cross-beams 24 also shown in FIGS. 1 and 3. A cross-brace 26 is coupled to and extends between the I-beams 22. Floor planks 28 of the floor assembly 12 extend longitudinally along the trailer 10 and rest on the cross beams 24, as shown best in FIGS. 1 and 4.

As noted above, the floor assembly 12 includes first and second side rails 20 such that each side rail 20 extends along a length of the right and left sides of the trailer 10. In particular, one side rail extends along one side of the floor assembly 12 while the other side rail 20 extends along the other side of the floor assembly 12. For purposes of the description herein, however, only one side rail 20 will be described herein. However, it should be understood that the two side rails 20 of the trailer 10 are identical in configuration and function.

Illustratively, as shown in FIG. 2, the side rail 20 includes an outer, vertical wall 30, a bottom, inwardly-extending wall 32 coupled to a bottom end of the vertical wall 30, and a top, inwardly-extending wall 34 coupled to a top end of the vertical wall 30. The top wall 34 includes an outer top wall member 36 and an inner top wall member 38 spaced-apart from the outer top wall member 36 by a longitudinally-extending groove, or channel, 40 formed in the top wall 34 of the side rail 20. Illustratively, the channel is defined by a channel mount 43 of the top wall 34. In particular, the channel mount 43 includes a first vertical member 42 coupled to the outer top wall member 36, a second vertical member 44 coupled to the inner top wall member 38 and spaced-apart from the first vertical member 42, and a base wall member 46 coupled to a bottom end of each of the first and second vertical members 42, 44 to define the channel 40 therebetween. As shown in FIG. 2, the base wall member 46 includes a horizontal member 49 and an upwardly-extending lip 51 coupled to an inward end of the horizontal member 49. Illustratively, as viewed from an end view of the trailer 10, the horizontal member 49 of the base wall 46 extends transversely to the right and left beyond the first and second vertical members 42, 44 such that a width 50 of the base wall member 46 is greater than a width 52 of a widest portion of the channel 40 and is also greater than a distance between the outer surfaces of the vertical walls 42, 44 which define the channel 40. Illustratively, the width 50 is approximately 2.5 inches and the width 52 is approximately 1.0 inches while the distance between the outer surfaces of the vertical walls 42, 44 is approximately 1.6 inches. However, it should be understood that it is within the scope of the disclosure for the base wall member 46 to include any suitable dimensions as well.

Illustratively, the top wall 34 further includes a third vertical member 54 spaced inwardly from the second vertical member 44 and extending downwardly from an innermost end of the top wall member 38. A transversely-extending flange 56 of the top wall 34 is coupled to the bottom end of the inner, vertical member 54, as shown in FIG. 2. Further, illustratively, the side rail 20 specifically does not include a generally diagonally-extending cross member extending between the top wall 34 and either the vertical, outer wall 30 or the bottom wall 32. As is discussed in greater detail below, the horizontal wall member 49 of the base wall 46 is configured to be welded to the cross members 24 of the floor assembly 12 in order to provide additional strength to the side rail 10 while the lack of any cross member of the side rail 20 aides in providing sufficient room for the use of first and second cargo restraint devices with the side rail 20.

Illustratively, the channel 40 defined in the top wall 34 of the side rail 20 is generally J-shaped in cross-section such that a top opening 60 of the channel 40 defines a width that is smaller than the width 52 of the bottom-most portion of the channel 40. The top opening 60 is thus defined by a lip 62 of the top wall member 38 which extends outwardly from the second vertical wall member 46, as shown in FIG. 1.

As shown in FIGS. 1 and 2, the side rail 20 is configured to be coupled to the cross beams 24 of the floor assembly 12 such that the bottom wall 32 is positioned below the cross beams 24 and the top wall 34 is positioned above and in engagement with a top surface 64 of the cross beams 24. As shown in FIG. 2, the top wall members 36, 38 of the top wall 34 are spaced-apart from the top surface 64 of the cross members 24. Illustratively, the side rail 20 is located at the outermost sides of the floor assembly 12 of the trailer 10 and is coupled to the outer ends of the cross members 24 of the floor assembly 12. In particular, a bottom surface of the horizontal member 49 of the base wall 46 and a bottom surface of the flange 56 are engaged with the top surface 64 of the cross beams 24. Illustratively, therefore, the flange 56 and the horizontal member 49 of the base wall 46 are welded to the top surface 64 of the cross members 24 in order to secure the side rail 20 thereto. It should be understood that while the side rail 20 is welded to the cross members 24, it is also within the scope of this disclosure for the side rail 20 to be coupled to the cross members 24 using any suitable mechanical fastener and/or adhesive including, but not limited to, rivets, nails, screws, nuts and bolts, epoxies, etc. Illustratively, the side rail 20 is made from an extruded piece of aluminum. However, it should be understood that the side rail 20 may be made from one or more any suitable materials including, but not limited to, metals, metal alloys, plastics, composites, and wood, for example. Further, it is within the scope of the disclosure to provide a side rail that is not extruded as a single component, but is made of separate components coupled together.

Illustratively, as shown in FIG. 2, a width 70 of the outer top wall member 36 is less than a width 72 of the inner top wall member 38 such that the channel 40 formed in the top wall 34 is positioned outwardly from a vertical centerline 74 shown in FIG. 1 through a center of an overall width 76 of the top wall 34. Specifically, the width 70 of the outer top wall member 36 is approximately 0.88 inches while the width 72 of the inner top wall member 38 is approximately 4.43 inches and the overall width 76 of the top wall 34 is approximately 6.74 inches.

A first cargo restraint device 80 is provided for use with the side rail 20 of trailer 10. Illustratively, the first cargo restraint device 80 is a sliding load securement bracket. In particular, the bracket 80 is provided for use with the channel 40 formed in the side rail 20. Illustratively, the bracket 80 is generally rectangular (as shown in FIG. 3) and defines a generally J-shaped cross-section (as shown in FIGS. 1 and 2). The bracket 80 includes an aperture 82 (as shown in FIG. 3) formed through an upper, body section 84 while a lower, J-section 86 is received within the channel 40 of the side rail 20. When properly coupled to the side rail 20, a lip on the J-section 86 of the bracket engages the lip 62 of the side rail 20 in order to prevent the bracket 80 from being vertically removed from the channel 40.

In use, the bracket 80 may be moved, or slid, within the channel 40 along a longitudinal length of the side rail 10 in order to position the bracket 80 at any suitable location on the trailer 10 in order to properly secure cargo to the trailer 10. A securing chain or strap (not shown) for use in either retaining or positioning cargo may be attached to the mounting bracket 80 by a hook, for example, placed through the aperture 84 in order to secure or position cargo on the trailer 10. When the hook is placed under tension, the mounting bracket 80 is moved upwardly to draw the lip of the J-section 86 against the lip 62 of the top wall 34 of the side rail 20. While the bracket 80 is only shown in a generally vertical orientation on the side rail 20, it should be understood that the bracket 80 is also pivotable within the channel 40 such that the main body 84 of the bracket 80 may be positioned at any suitable angle relative to the generally flat upper surface of the top wall 34 of the side rail 20. When not in use, the bracket 80 may be removed, or uncoupled, from the side rail by rotating the main body 84 in an inward direction to disengage the lip 62 of the side rail 20 from the corresponding lip or J-section 86 of the bracket 80 and removing the J-section 86 of the bracket 80 from the channel 40.

As shown in FIGS. 1-3, the side rail 20 of the trailer 10 is configured to accommodate a second cargo restraint device 90. Illustratively, the side rail 20 includes an aperture 92 formed in the inner top wall member 38, through which the second cargo restraint device 90 may be located. In particular, the second cargo restraint device 90 is a chain tiedown such as that described in U.S. Pat. No. 7,537,423, for example. As shown in FIGS. 1 and 2, the illustrative restraint device 90 generally includes an upper cap 100, a chain 102 extending downwardly from the cap 100, and an end lock 104 coupled to a bottom end of the chain 102. Illustratively, a diameter of the cap 100 is generally the same or similar size as a diameter of the aperture 92 formed in the side rail 20 such that a top surface of the cap 100 is generally flush with a top surface of the outer wall member 38 of the side rail 100 when the device 90 is installed therein. A bar 108 is illustratively welded to an underside of the inner top wall member 38 and an aperture 110 formed therethrough is aligned with the aperture 92 formed in the side rail 20. The aperture 110 is smaller than the aperture 92 and smaller than the cap 100 of the device 90 such that an outer rim of the cap 100 is configured to rest on a portion of the bar 108 around the aperture 110 in order to support the cap 100 thereon. In use, a securing chain or strap for use in either retaining or positioning cargo may be attached to a link of the chain 102 of the device 90 by a hook, for example, in order to secure or position cargo on the trailer 10. When the hook is placed under tension, the device 90 is moved upwardly to draw the end lock 104 tightly against a bottom surface of the bar 108.

Illustratively, as shown in FIG. 1, the aperture 90 is positioned inwardly (i.e., toward the center of the trailer 10 and away from the outer vertical wall 30 of the side rail 20) of the channel 40 formed in the top wall 34 of the side rail 20 in order to position the second cargo restraining device, i.e. the chain tie down 90, inwardly of the first cargo restraining device 80, i.e. the mounting bracket 80. As shown in FIG. 3, the top wall 34 includes a number of apertures 92 formed therein in order to accommodate a number of devices 90. It should be understood that the side rail 20 may be provided with any one or more apertures 92 formed therein in order to accommodate one or more devices.

Thus, the side rail 20 is configured to accommodate two different types of cargo restraining devices therein. In particular, the channel 40 is configured to cooperate with the mounting bracket 80 to provide a multi-position, sliding cargo restraining device. Further, the one or more apertures 92 of the side rail 20 are configured to cooperate with the second cargo restraint device 90 to provide a chain tie down restraining device. Typically, a side rail of a flatbed trailer, such as the trailer 10, is only able to accommodate one cargo restraining device such that a typical trailer may include either a channel configured to cooperate with a mounting bracket or an aperture configured to cooperate with a chain tie down device 90, but not both. Such limited accommodations are oftentimes due to constrains in the size of the top wall of a side rail and/or to placement of supporting cross-braces typically found in many side rails. Oftentimes one particular cargo restraining device may be desired over the use of another cargo restraining device depending upon the size, shape, and/or weight of the cargo to be carried on the floor assembly 12 of the trailer 10. Thus, providing a trailer 10 capable of accommodating two different cargo restraining devices therein provides a use with the ability to use one or more different types of cargo restraint devices in order to better accommodate different types of cargo loads to be carried on the trailer 10.

Illustratively, the wide width of the base member 46 of the side rail 20 provides additional strength to the side rail 20 in order to help prevent the side rail 20 from bending or otherwise deforming due to loads placed on the side rail 20 via the mounting bracket 80 and/or the chain tie 90 when these cargo restraining devices 80, 90 (and the corresponding restraining straps) are used to restrain cargo on the floor assembly 12 of the trailer 10. As noted above, the entire width 50 of the horizontal member 49 of the base wall 46 is welded to the cross members 24 of the floor assembly 20 in order to secure the side rail 20 to the cross members 24. Welding along the widened width 50 of the base wall 46 provides additional strength to the side rail 20 in order to further help prevent the side rail 20 from deforming due to loads placed thereon.

Figure 4:
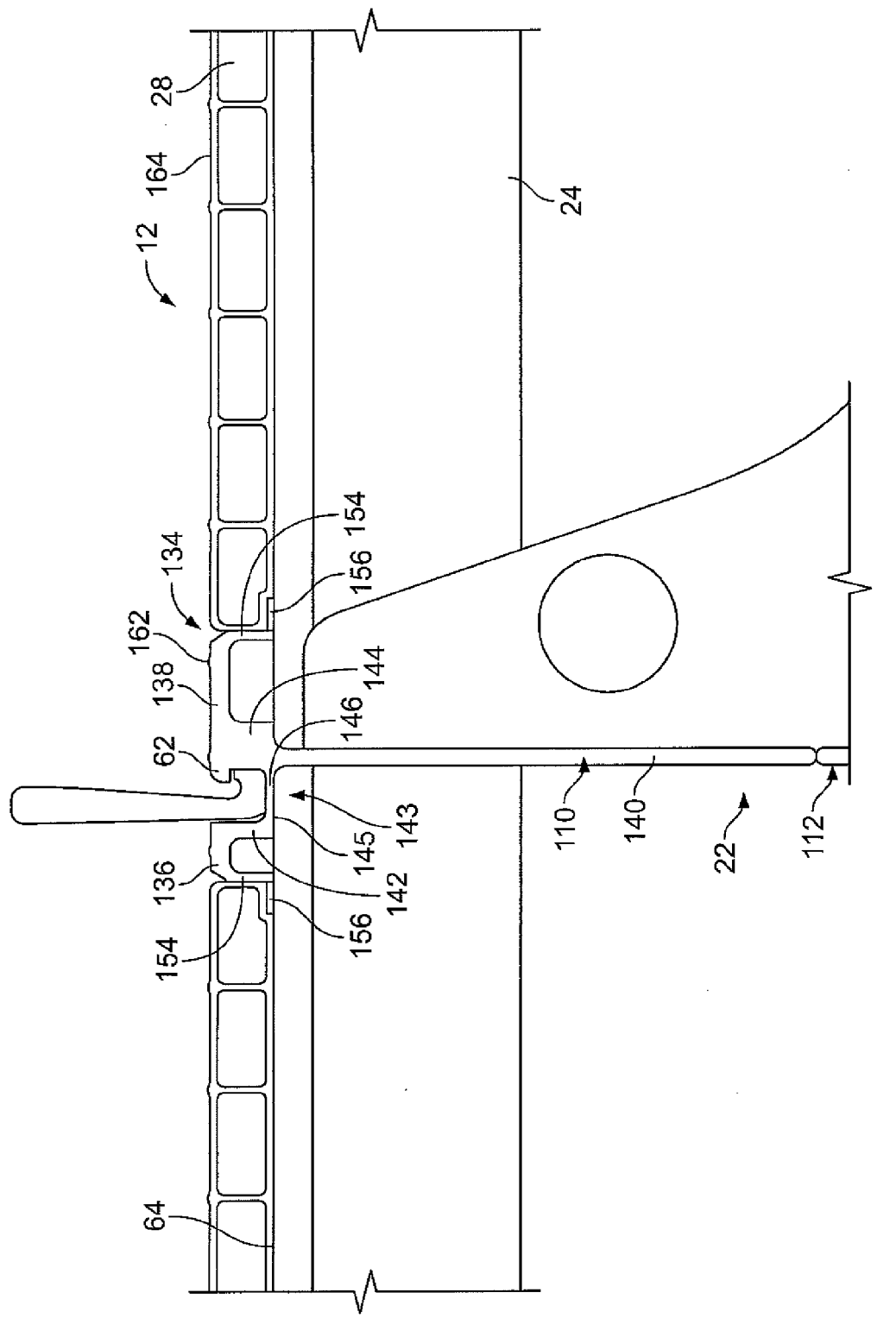
FIG. 4 is an end view of a portion of the flatbed trailer of FIGS. 1-3 showing an upper member of one of the longitudinally-extending I-beams of the floor assembly and further showing one of the cargo restraint systems coupled thereto.

Looking now to FIG. 4, the trailer 10 further includes two longitudinally-extending I-beams 22 of the floor assembly 12. Such I-beams are oftentimes constructed of two generally T-shaped members (i.e., an upper T-member 110 and a lower T-member 112 welded together). However, it should be understood that the I-beams may comprise a single component rather than the upper and lower T-members 110, 112 coupled together. Illustratively, the I-beams 22 are located inwardly and are spaced-apart from each of the first and second side rails 20 of the trailer 10. As shown in FIGS. 1 and 4, each of the I-beams 22 includes a channel 40 formed therein. The channel 40 is configured to accommodate one or more mounting brackets 80 in order to provide an inwardly-positioned cargo restraint device. While the floor assembly 12 includes two longitudinally-extending I-beams 22, only one I-beam will be described herein. However, it should be understood that the two I-beams 22 of the trailer 10 are identical in configuration and function.

Illustratively, as shown in FIG. 4, the upper T member 110 of the I-beam 22 includes a top wall 134 and a vertical wall 140 coupled to the top wall 134 and extending downwardly therefrom. Illustratively, a top surface 162 of the top wall 134 is generally flush with a top surface 164 of the floor planks 28 while a bottom end of the vertical wall 140 is positioned generally below the cross members 24 of the floor assembly 12. The top wall 134 includes spaced-apart top wall members 136, 138, first and second generally vertical wall members 154 coupled to the outside end of each of the top wall members 136, 138, and a flange member 156 coupled to the bottom end of each of the vertical wall members 154. The flange members 156 are coupled to the top surface of the cross members 24 via welding. However, it should be understood that the flange members 156 of the I-beam 22 may be coupled to the cross members 24 via other suitable fasteners including, but not limited to, rivets, nails, screws, nuts/bolts, and adhesives, for example. The I-beam 22 further includes a channel mount 143 defining the channel 40 therein. The channel mount 143 of the I-beam 22 is similar to the channel mount 43 of the side rail 20. Illustratively, the channel mount 143 includes a first vertical wall 142 and a second vertical wall 144 spaced-apart from the first vertical wall 142. Illustratively, the second vertical wall 144 is thicker than the first vertical wall 142. However, it should be understood that the first and second vertical walls 142 may include any suitable thickness such that the first vertical wall may be as thick as or thicker than the second vertical wall 144, for example. As shown in FIG. 4 the second vertical wall 144 is positioned inwardly (i.e., toward a longitudinal center of the floor assembly 12) from the first vertical wall 142 and is coupled to a lip 62 of the top wall member 38 which extends outwardly (i.e., away from a longitudinal center of the floor assembly 12) to define the J-shape of the channel 40.

The first and second vertical walls 142, 144 are coupled to each other by a horizontal base wall 146 which cooperates with the first and second vertical walls 142, 144 to define the channel 40. The channel mount 143 defines a lower, or base, surface 145 which is configured to engage and be coupled to the upper surface 64 of the cross members 24 of the floor assembly 12. Illustratively, the base surface 145 defines a width that is greater than a width of the widest portion of the channel 40. As shown in FIG. 4, a portion of the base surface 145 is positioned to the right (i.e., inward) of the vertical wall 140 of the I-beam while another portion of the base surface 145 is positioned to the left (i.e. outward) of the vertical wall 140. Illustratively, the channel 40 formed within the channel mount 142 is positioned to the left of the vertical wall 140.

The channel 40 of the I-beams 22 provides the same function as the channel 40 formed in the side rails 20. That is, the channel 40 of each I-beam 22 is configured to receive the mounting bracket 80 therein in order to secure cargo on the floor assembly 12 of the trailer 10. The mounting bracket 80 may be slid along within the channel 40 along the length of the top wall 134 of the I-beam 22 to be positioned at any suitable location. When properly coupled to the I-beam 22, a lip on the J-section 86 of the bracket 80 engages the lip 62 of the top wall 134 of the I-beam 22 in order to prevent the bracket 80 from being vertically removed from the channel 40.

Figure 5:
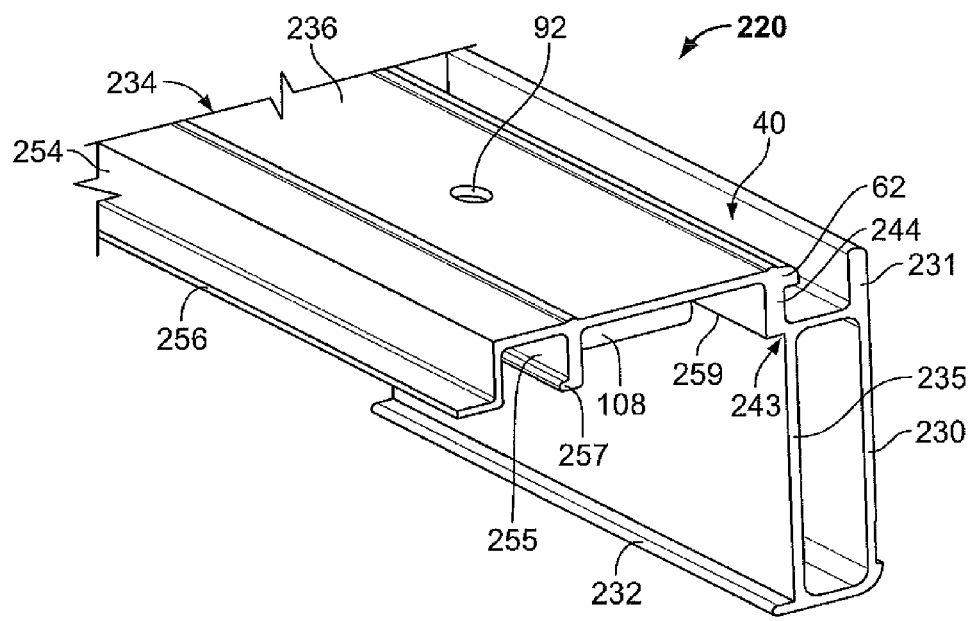
FIG. 5 is a perspective view of a portion of an alternative side rail for use with the first and second restraint systems.
Figure 6:
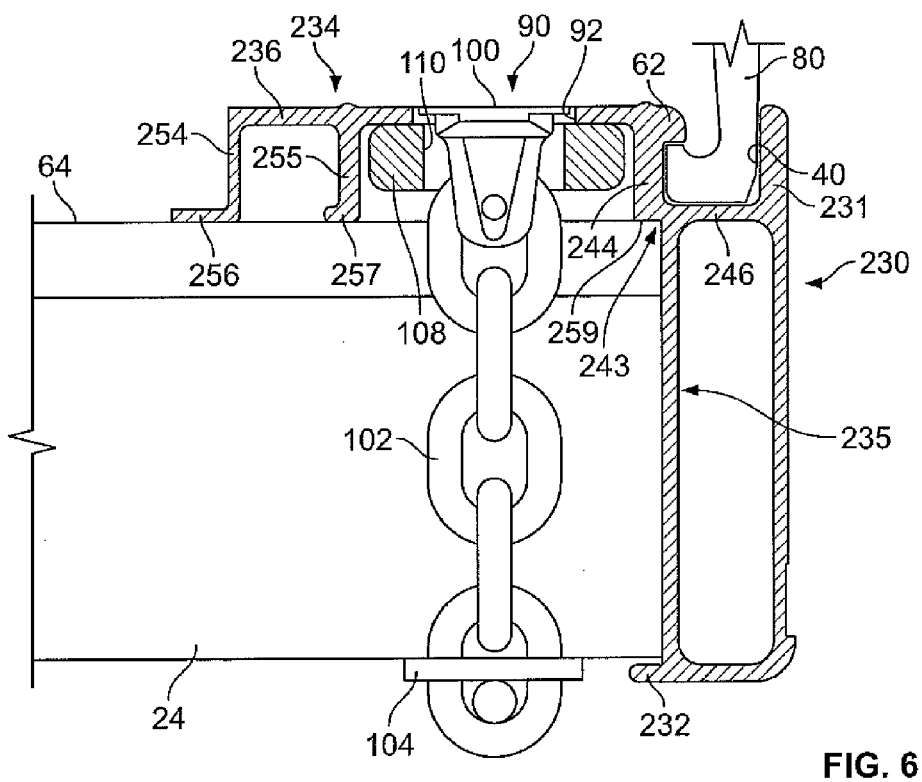
FIG. 6 is a sectional view similar to FIG. 2 showing a floor assembly including of the side rail of FIG. 5 and showing first and second restraint systems coupled to the side rail of the trailer for securing cargo thereon.

Looking now to FIGS. 5 and 6 an alternative side rail 220 is provided. The side rail 220 is similar to the side rail 20, and as such, common reference numbers are provided to refer to the same or similar components. Illustratively, the side rail 220 includes an outer, vertical wall 230, a bottom, inwardly-extending wall 232 coupled to a bottom end of the vertical wall 230, and a top, inwardly-extending wall 234 coupled to a top end portion of the vertical wall 230. The top wall 234 includes a channel mount 243 which defines the longitudinally-extending channel 40 configured to receive the first cargo restraint device 80 therein. The cargo restraint device 80 is movable within the channel 40 in the same manner as that described above in regard to the side rail 20.

The channel mount 243 includes an upper portion 231 of the vertical wall 230, a vertical member 244 coupled to the top wall 234 and spaced-apart from the upper portion 231 of the outer vertical wall 230, and a base wall member 246 coupled to a bottom end of the vertical member 244 and coupled to the outer vertical wall 230 to define the channel 40 therebetween. As shown in FIG. 6, a second outer, vertical wall 235 is coupled to the base wall member 246 of the channel mount 243 and extends downwardly therefrom to the bottom wall 232. Illustratively, the vertical wall 235 is parallel to the vertical wall 230 and is spaced inwardly therefrom. As shown in FIG. 6, the second outer, vertical wall 235 is configured to engage an outer end of the cross-member 24. Further illustratively, a portion of the bottom wall 232 extends inwardly beyond the second outer, vertical member 235 to be positioned below and engaged with the cross-member 24.

Illustratively, the top wall 234 further includes a horizontal member 236 coupled to the channel mount 243 and an additional vertical member 254 extending downwardly from an innermost end of the horizontal member 236 of the top wall 234. A transversely extending flange 256 of the top wall 234 is coupled to the bottom end of the inner, vertical member 254, as shown in FIG. 6. The top wall 234 further includes yet another vertical member 255 extending downwardly from the horizontal member 236 of the top wall 234 at a location spaced outwardly from the vertical member 254. A transversely extending flange 257 is coupled to the bottom end of the vertical member 255. Illustratively, the vertical member 254 and the vertical member 255 are parallel to each other.

Similar to the side rail 20, the side rail 220 does not include a generally diagonally-extending cross member or support member which extends between an inner portion of the top wall 243 and the outer vertical wall 230. Illustratively, the flanges 256, 257 as well as a bottom ledge 259 of the base wall member 246 are configured to be welded to the top surface 64 of the cross members 24 of the floor assembly 12. Further illustratively, both outer vertical wall members 230, 235 are positioned outside the cross member 24 such that the second outer vertical wall member 235 is adjacent to and engaged with the cross member 24 while the outer wall member 230 is spaced-apart from the end of the cross-member 24. Thus, the channel 40 formed in the channel mount 243 is generally positioned outside a vertical plane defined by the end surfaces of the cross member 24. Illustratively, the channel mount 243 is positioned generally directly above the first and second outer, vertical members 230, 235.

It should be understood that while the side rail 220 is welded to the cross members 24, it is also within the scope of this disclosure for the side rail 220 to be coupled to the cross members 24 using an suitable mechanical fastener and/or adhesive including, but not limited to, rivets, nails, screws, nuts and bolt, epoxies, etc. Similar to the side rail 20, the side rail 220 is made from an extruded piece of aluminum. However, it should be understood that the side rail 220 may be made from one or more suitable materials including, but not limited to metals, metal alloys, plastics, composites, and wood, for example. Further, it is within the scope of this disclosure to provide a side rail that is not extruded as a single component, but is made of separate components coupled together.

Similar to the side rail 20, the side rail 220 is configured to accommodate the second cargo restraint device 90. Illustratively, the side rail 220 includes one or more apertures 92 formed in the top wall 234 through which the second cargo restraint device 90 may be located. Illustratively, each aperture 92 is positioned between the vertical member 255 and the vertical wall 244 of the channel mount 243, as shown in FIG. 6. The device 90 is coupled to the side rail 220 in the same or similar manner as described above in regard to the side rail 20. Thus, the side rail 220 is configured to accommodate two different types of cargo restraining devices therein. In particular, the channel 40 is configured to cooperate with the mounting bracket 80 to provide a multi-position, sliding cargo restraining device while the one or more apertures 92 of the side rail 220 are configured to cooperate with the second cargo restraint device 90 to provide a chain tie down restraining device.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A side rail of a flatbed trailer configured to (i) extend along a length of the trailer along one side of the trailer, and (ii) be coupled to and positioned outwardly from a transversely-extending cross-member of a floor assembly of the trailer, the side rail comprising:
   a channel formed in a top wall of the side rail, wherein the channel extends along a length of the side rail, wherein the channel is configured to receive a first cargo restraint device therein, and wherein the channel is configured to be positioned outside a lateral end of the transversely-extending cross-member of the floor assembly when the side rail is coupled to the cross-member; and
   an aperture formed in the top wall of the side rail at a location spaced-apart from the channel, wherein the aperture is configured to receive a second cargo restraint device therein, and
   wherein the channel is generally J-shaped when viewed in cross-section.

2. The side rail of claim 1, wherein the first cargo restraint device is different from the second cargo restraint device.

3. The side rail of claim 1, wherein the aperture is spaced inwardly from the channel.

4. The side rail of claim 1, further comprising (i) an outer, vertical wall coupled to an outer end of the top wall and depending downwardly below a bottom-most surface of the top wall, and (ii) a bottom wall coupled to the outer, vertical wall, and wherein the side rail is devoid of any angled cross brace extending from the top wall to either the outer, vertical wall or the bottom wall.

5. The side rail of claim 4, wherein the outer, vertical wall is a first outer, vertical wall, and further comprising a second outer, vertical wall parallel to the first outer, vertical wall and depending downwardly below a bottom-most surface of the top wall, and wherein the channel is positioned generally directly above the first and second outer, vertical walls, and further wherein the first and second outer, vertical walls are each configured be located laterally outside the transversely-extending cross-member of the floor assembly.

6. The side rail of claim 1, wherein the channel formed in the top wall is defined by spaced-apart vertical members of the top wall and a base member of the top wall coupled to the bottom of the vertical members.

7. The side rail of claim 6, wherein a portion of the base member is configured to be welded to a cross-member of the floor assembly.

8. The side rail of claim 1, wherein the channel is positioned outwardly from a center of the top wall when viewed in cross-section.

9. The side rail of claim 1, wherein the top wall includes a channel mount configured to define the channel therein, a horizontal member, and first and second vertical members extending downwardly from the horizontal member, wherein the first and second vertical members are positioned inwardly from the channel and are configured to be welded to a top surface of the cross-member of the floor assembly.

10. The side rail of claim 9, wherein the aperture is positioned between the channel mount and the second vertical member.

11. A side rail of a flatbed trailer configured to (i) extend along a length of the trailer along one side of the trailer, and (ii) be coupled to and positioned outwardly from a cross-member of a floor assembly of the trailer, the side rail comprising:
  a top wall; and
  a vertical wall coupled to an outer end of the top wall to extend downwardly below a bottom-most surface of the top wall in order to define a generally L-shaped side rail when viewed in cross-section, wherein the vertical wall is configured to be positioned outside of and engaged with an outer end of the cross-member of the floor assembly of the trailer,
  wherein the top wall includes a generally J-shaped channel configured to extend along a length of the side wall in order to receive a first cargo restraint device therein, wherein the channel is positioned at the outer end of the top wall, and wherein the channel is positioned directly above the vertical wall, and
  wherein the top wall includes a horizontal member, an aperture through the horizontal member and positioned at a location spaced inwardly from the channel, and first and second vertical members extending downwardly from the horizontal member and configured to be welded to a top surface of the cross-member, wherein the aperture is positioned between the first and second vertical members.

12. The side rail of claim 11, wherein the vertical wall is a first vertical wall and further comprising a second vertical wall parallel to and spaced-apart from the first vertical wall and depending downwardly below a bottom-most surface of the top wall, wherein the first and second vertical walls are each configured to be located laterally outside an end of the cross-member of the floor assembly of the trailer, wherein the J-shaped channel is positioned directly above the first and second vertical walls.

* * * * *

UNITED STATES PATENT AND TRADEMARK OFFICE
CERTIFICATE OF CORRECTION

| | | |
|---|---|---|
| PATENT NO. | : 8,985,921 B2 | Page 1 of 1 |
| APPLICATION NO. | : 13/803092 | |
| DATED | : March 24, 2015 | |
| INVENTOR(S) | : Travis Smith McCloud | |

It is certified that error appears in the above-identified patent and that said Letters Patent is hereby corrected as shown below:

Title Page, items (71) and (72)
Applicant and Inventor Travis Smith McCloud's address should be Cadiz, KY.

Signed and Sealed this
Sixteenth Day of February, 2016

Michelle K. Lee
*Director of the United States Patent and Trademark Office*